(12) United States Patent
Whang

(10) Patent No.: US 7,966,251 B2
(45) Date of Patent: Jun. 21, 2011

(54) CREDIT EVENT REFERENCED ASSET THAT MINIMIZES AN INVESTOR'S RISK OF LOSS OF PRINCIPAL

(75) Inventor: Suk Michael Whang, Brooklyn, NY (US)

(73) Assignee: Barclays Capital Inc., New York, NY (US)

(*) Notice: Subject to any disclaimer, the term of this patent is extended or adjusted under 35 U.S.C. 154(b) by 1692 days.

(21) Appl. No.: 10/136,987

(22) Filed: May 1, 2002

(65) Prior Publication Data

US 2002/0184142 A1    Dec. 5, 2002

Related U.S. Application Data

(60) Provisional application No. 60/287,922, filed on May 1, 2001.

(51) Int. Cl.
G06F 17/60 (2006.01)
(52) U.S. Cl. .......................................... 705/38; 705/35
(58) Field of Classification Search ................. 705/38, 705/36 R, 37, 35; 714/100
See application file for complete search history.

(56) References Cited

U.S. PATENT DOCUMENTS

| | | | | |
|---|---|---|---|---|
| 7,249,075 | B1 * | 7/2007 | Altomare et al. | 705/35 |
| 7,324,967 | B1 * | 1/2008 | Sankaran et al. | 705/35 |
| 2001/0056392 | A1 * | 12/2001 | Daughtery, III | 705/36 |
| 2002/0035530 | A1 * | 3/2002 | Ervolini et al. | 705/36 |

OTHER PUBLICATIONS

Sunil K. Aggrawal, Credit Derivatives Move Beyond Plain Vanilla, Spring 2000, The Stern Journal. pp. 45-54.*
Barbara J. Kvittem-Barr, Richard Furmanski, and Michael Herst, Update on the Taxation of Discount and Premium Bonds, May, 1991, Trusts & Estates, vol. 130, Iss. 5, pp. 50-51.*
David Nirenberg and Steven Kopp, Credit Derivatives: Tax Treatment of Total Return Swaps, Default Swaps, and Credit-Linked Notes, Aug. 1997, Journal of Taxation, vol. 87, Iss. 2, pp. 82-96.*
Robert S. Neal, "Credit Derivatives: New Financial Instruments for Controlling Credit Risk," 2nd Qtr 1996, 81, 2, pp. 23-24.*
Christopher O'Leary, "The CDO Revolution Continues as Market Awaits Issue Backed by Hedge Fund Debt: Other deals backed by munis, even hedge fund managers, also in works," Mar. 5, 2001, The Investment Dealers' Digest: IDD. NY , p. 1.*
Stephen Lumpkin,"Trends and Developments in Securitisation," Oct. 1999, Financial Market Trends, 74, p. 15.*
John Downes et al., Dictionary of Finance and Investment Terms, 1995, Baron's Educational Serires, Inc., Haupppauge, NY, p. 329.*
Bowler et al., Credit Derivatives and Structured Credit, Aug. 30, 2000, Deutsche Bank, pp. 10-11,15, 17, 31.*
Downes, et al., "Dictionary of Finance and Investment Terms," 1998, Barron's Educational Series, Inc., pp. 432, 469.*
Sarah Best, "Taking a view on credit," Feb. 1998, Global Investor, Iss. 109, pp. 1-4.*

(Continued)

*Primary Examiner* — Jagdish N Patel
*Assistant Examiner* — Kenneth Bartley
(74) *Attorney, Agent, or Firm* — Morgan Lewis & Bockius LLP

(57) ABSTRACT

A credit event referenced asset having a par value includes (a) a provision for a right of a creditor to receive interest on the asset for a credit term, wherein the interest is reduced if a credit event occurs with respect to a reference entity, and (b) a provision for a right of the creditor to receive the par value at a maturity date of the asset.

8 Claims, 3 Drawing Sheets

OTHER PUBLICATIONS

Marci Baker, "Exploring the risk frontier," Aug. 18, 1997, vol. 63, Iss. 33, p. 1-10.*

Freddie Mac, "Federal Home Loan Mortgage Corporation," Sep. 1989, pp. 1-32.*

Business Editors, "Fitch IBCA RTS WI Petro Inspect Fee Rev Extend Muni CP 'Fl'," May 3, 2000, Business Wire, New York, p. 1-.3.*

Kay Binnie, "Making hay from tobacco," Nov. 2000, Euromoney, pp. 1-5.*

* cited by examiner

CREDIT EVENT REFERENCED ASSET THAT MINIMIZES AN INVESTOR'S RISK OF LOSS OF PRINCIPAL

CROSS REFERENCE TO RELATED APPLICATIONS

The present application is claiming priority of U.S. Provisional Patent Application Ser. No. 60/287,922, filed on May 1, 2001.

BACKGROUND OF THE INVENTION

1. Field of the Invention

The present invention relates to credit event referenced assets, and more particularly, to a credit event referenced asset and a method for managing the asset where a risk of loss of an investor's principal is minimized. The asset provides a yield to the investor for a credit term, and the investor is entitled to the principal at a maturity date of the asset. However, if a credit event occurs with respect to a reference entity, then the yield is reduced and the maturity date may be extended. Thus, the investor's risk is one of a reduced yield and an extended maturity.

2. Description of the Prior Art

A credit event referenced asset is a financial instrument that is issued by an issuer, and that is linked to a credit performance of a reference entity. The reference entity is a party other than the issuer. For example, PQR Corp. can issue a credit event referenced asset that is linked to a credit performance of Venezuela.

In a conventional credit event referenced asset arrangement, the credit event referenced asset is sold, for par value, by an issuer to an investor. The issuer pays interest to the investor so long as a defined credit event has not occurred with respect to the reference entity prior to a maturity date. Such a credit event might be, for example, the reference entity's default on a loan. If a credit event occurs prior to the maturity date, the credit event referenced asset is redeemed early. The redemption value paid by the issuer to the investor is determined by reference to the decrease in value of an obligation of the defaulting reference entity. The redemption value will be an amount less than the par value. Thus, in a conventional credit event referenced asset arrangement, the investor's return of principal is at risk.

Under current U.S. tax law, a conventional credit event referenced asset arrangement is considered a contingent payment debt, that is, a debt where an expected return on the debt is not known at the time of inception. Conventional credit event referenced assets are subject to the contingent payment debt rules as there is an event that could result in a cancellation of the obligation to pay principal. If a municipal bond issuer were to issue a bond that is deemed to be contingent payment debt, only a portion of the payments made on the bond will be tax exempt, unlike non-contingent payment debt. The portion of the return that approximates the yield on a generic tax-exempt municipal bond would be tax exempt. Any yield in excess of the allowable yield would be taxable for federal income tax purposes. As an example, if a municipal bond issuer could issue a tax exempt bond, which is a conventional credit event referenced asset, that paid interest at a rate of 7% for 5 years, and the allowable yield under the tax regulations was 4%, the additional 3% of yield would be taxable.

SUMMARY OF THE INVENTION

There is a need for a credit event referenced asset arrangement that minimizes an investor's risk of loss of principal.

There is also a need for a credit event referenced asset that is suitable for use with a tax-exempt security.

The present invention provides for a credit event referenced asset having a par value and includes (a) a provision for a right of a creditor to receive interest on the asset for a credit term, wherein the interest is reduced if a credit event occurs with respect to a reference entity, and (b) a provision for a right of the creditor to receive the par value at a maturity date of the asset. The occurrence of a credit event can result in a reduction of the interest to be paid on the asset and a possible extension of a maturity date of the asset.

Another embodiment of the present invention provides for a method for managing a credit event referenced asset. The credit event referenced asset has a par value and a provision for a right of a creditor to receive interest on the asset for a credit term unless a credit event occurs with respect to a reference entity. The method, executable by a third party, includes obtaining a right, exercisable if the credit event occurs, for the third party to receive payments from the issuer of the credit event referenced asset for a defined period of time. The asset also has a provision for a right of the creditor to receive the par value at a maturity date of the asset. The third party is referred to herein as a hedge counter-party.

The present invention also provides another method of managing a credit event referenced asset that has a par value and a provision for a right of a creditor to receive interest on the asset for a credit term unless a credit event occurs with respect to a reference entity. The method, executable by a third party, includes obtaining a right, exercisable if the credit event occurs, to receive the par value in exchange for an investment that matures to the par value at a maturity date of the asset. The asset also has a provision for a right of the creditor to receive the par value at the maturity date. The third party is referred to herein as a hedge counter-party.

DESCRIPTION OF THE INVENTION

The present invention provides for a credit event referenced asset arrangement where an investor's risk of loss of principal is minimized. The investor, i.e., creditor, purchases the credit event referenced asset, i.e., invests principal, and is entitled to receive interest at a higher than normal interest rate from an issuer of the credit event referenced asset for a period of time know as a credit term. At the expiration of the credit term, the investor hopes either (i) to return the asset to the issuer and receive the original principal from the issuer, or (ii) to receive interest at the normal interest rate until the asset matures. The interest is subject to a credit event, such that if the credit event occurs, the interest is provided at a reduced rate, which may fall as low as 0%. Also, if the credit event occurs, the term of the asset may be extended. In any case, the investor is entitled to a return of the original principal, but the investor risks a possible reduction in interest (interest risk) and/or an extension of term (extension risk).

The credit event referenced asset has a par value and includes (a) a provision for a right of a creditor to receive higher than normal interest on the asset for a credit term, where the interest is reduced if a credit event occurs with respect to a reference entity, and (b) a provision for a right of the creditor to receive the par value at a maturity date. The right of the creditor to receive the par value at the expiration of the maturity date can be secured by another investment.

Figure 1A:
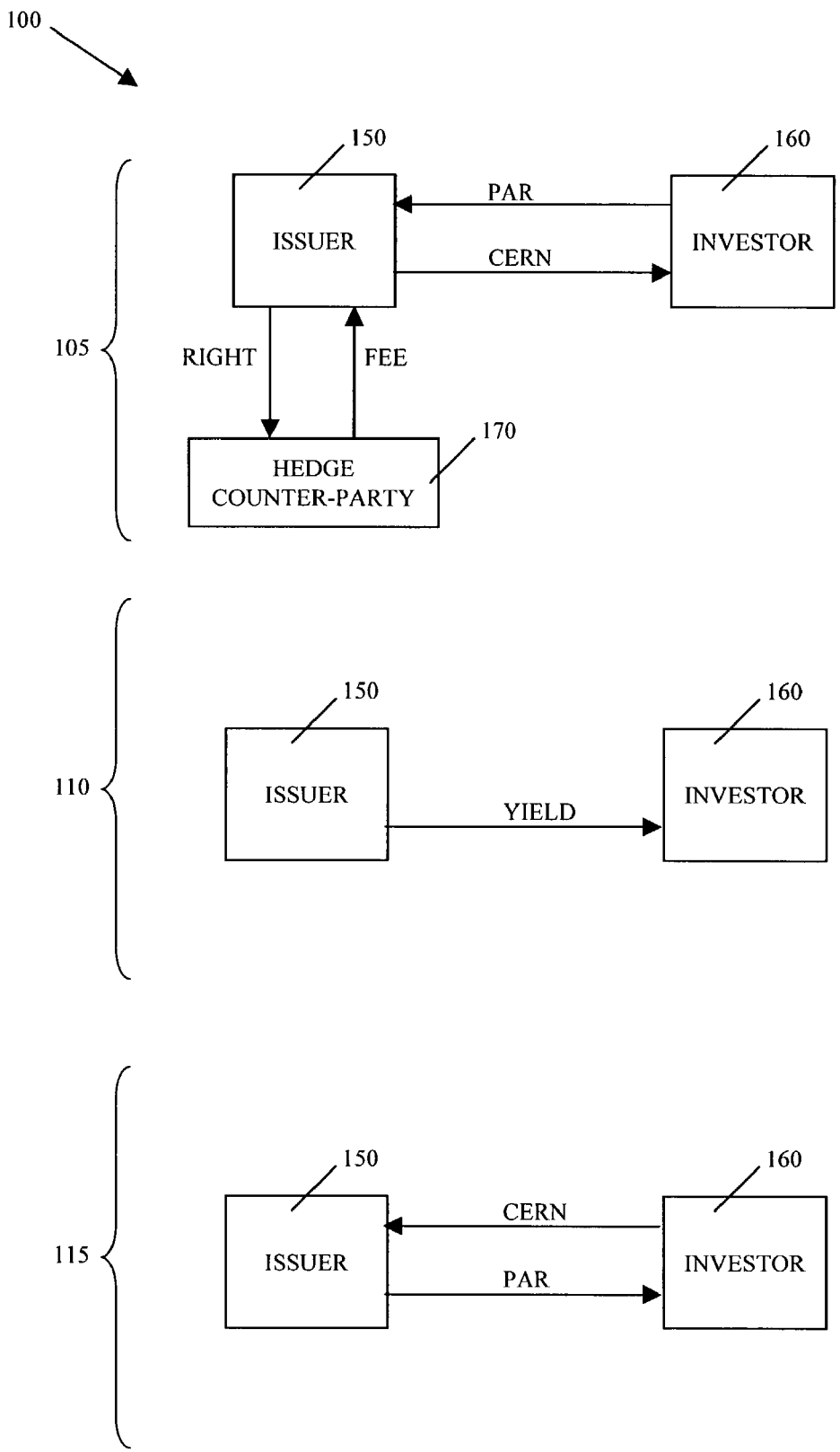
FIGS. 1A and 1B collectively are a diagram of a credit event referenced asset arrangement according to the present invention.
Figure 1B:
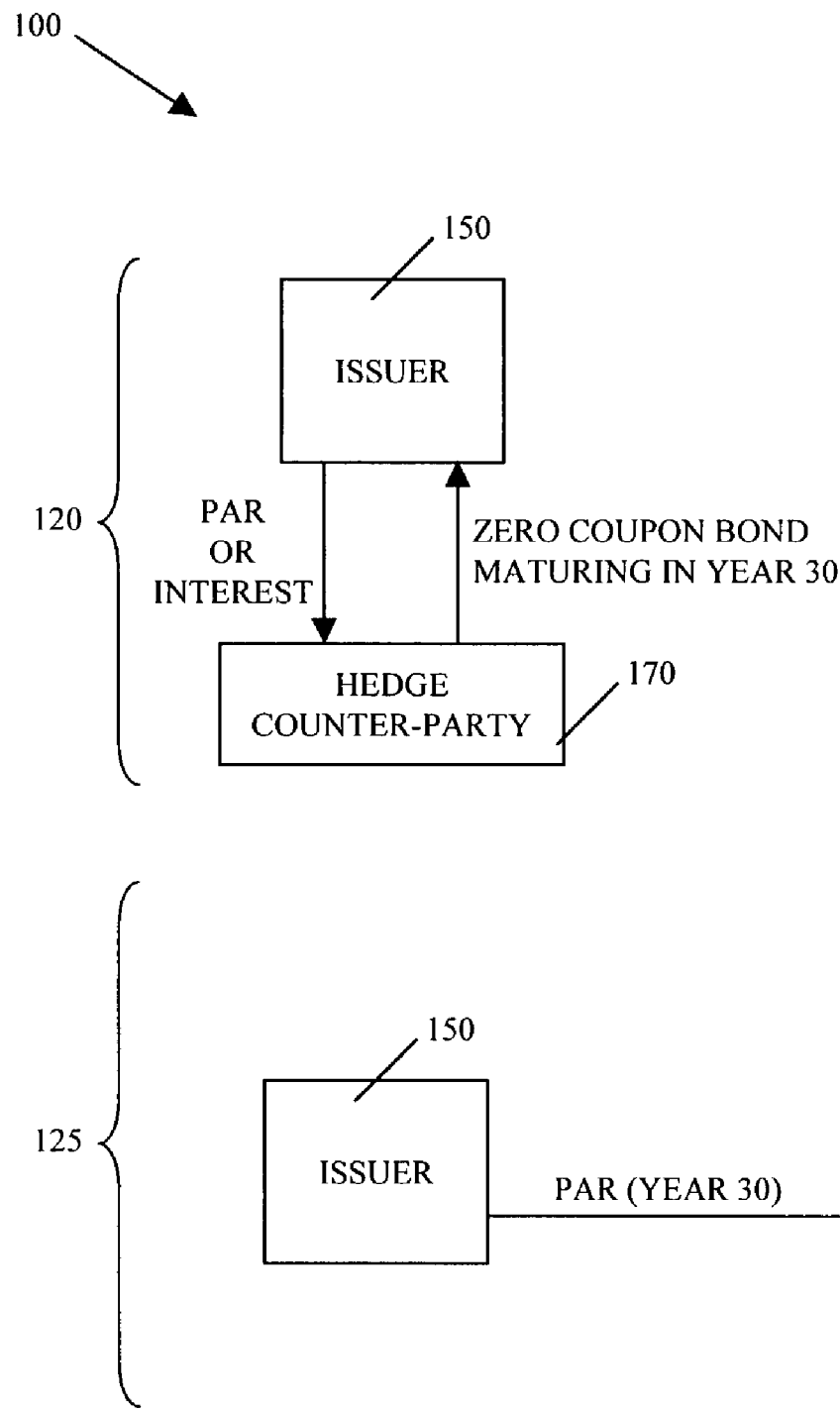

FIGS. 1A and 1B are, collectively, a diagram of a credit event referenced asset arrangement 100 according to the present invention. Arrangement 100 involves the participation of an issuer 150, an investor 160 and a hedge counter-party 170. FIGS. 1A and 1B show five sets of transactions, namely transactions 105, 110, 115, 120 and 125. Below, an overview of arrangement 100 is first presented, and thereafter, transactions 105, 110, 115, 120 and 125 are examined.

Arrangement 100 is described herein as using a credit event referenced note (CERN) to represent the credit event referenced asset, but in practice, the credit event referenced asset can be any debt instrument. The CERN is linked to a credit risk of a reference entity (not shown) that is unrelated to issuer 150. The reference entity can be any corporate, municipal, or sovereign debt issuer.

Issuer 150 issues a debt instrument, e.g., the CERN, to investor 160. The CERN provides for issuer 150 to pay interest at an interest rate. An initial interest rate will apply for a predetermined period of time, i.e., a credit term, subject to an occurrence of a credit event. That is, during the credit term, the CERN pays interest at the initial interest rate unless the credit event occurs.

If the credit event occurs during the credit term, then the interest rate is adjusted to another rate. This adjusted rate can be any other interest rate including zero. The rate can be adjusted on the date the credit event is deemed to have occurred or any other date up to and including the next scheduled interest payment date on the CERN.

The International Swap and Derivatives Association (ISDA) defines "a credit event", as any of the following events with respect to a specified reference entity:
(1) bankruptcy;
(2) failure to make a payment on debt;
(3) acceleration in payment obligation of debt;
(4) repudiation/moratorium; or
(5) restructuring.

However, the credit event can be any event agreed upon by issuer 150, investor 160 and hedge counter-party 170. The occurrence of the credit event can be determined by issuer 150 or by a third party who is not either of issuer 150 or the reference entity.

If the credit event does not occur during the credit term, then after the credit term (i) if the maturity date of the CERN coincides with the end of the credit term, then the investor will receive its principal, or (ii) if the maturity date is after the end of the credit term, then the interest rate on the CERN will step to another rate until a maturity date of the CERN. This stepped rate can be any other interest rate including zero.

The CERN can have any desired maturity date. For example, the CERN may have a fixed maturity date or a stated maturity date subject to a call or tender on an earlier date. A tender gives the investor the right to tender the CERN to the issuer on a date prior to maturity for a payment of par. A call gives the issuer the right to redeem the CERN prior to maturity for a payment of par. The CERN may also be subject to credit enhancement through a use of bond insurance, letter of credit or other bond credit enhancement device.

If the CERN was subject to a call or tender prior to the maturity date, then after the occurrence of the credit event, the CERN will not be callable or tenderable. The CERN will remain outstanding and bear interest at the adjusted rate until the maturity date.

If the CERN was not subject to a call or tender prior to the maturity date, then after the occurrence of the credit event, the CERN will remain outstanding and bear interest at the adjusted rate until the maturity date.

The maturity date of the CERN can be adjusted. The CERN may have an initial maturity date that will be adjusted to a later date if a credit event occurs.

At the time of issuance of the CERN, issuer 150 enters into a hedging arrangement with hedge counter-party 170. Under terms of the hedging arrangement, hedge counter-party 170 agrees to pay a fee to issuer 150, either up-front or over time. In return for this fee, issuer 150 agrees that if the credit event occurs during the credit term, issuer 150 will:
(1) make a periodic cash payment to hedge counter-party 170; and/or
(2) allow hedge counter-party 170 to deliver an investment that would defease issuer 150's obligation to make the payment of principal on the CERN maturity date for a payment equal to the principal amount of such debt.

Issuer 150 applies the fee from hedge counter-party 170 under the hedging arrangement to the payment of interest under the CERN until the credit event occurs or until the hedging arrangement terminates.

At the time of issuance of the CERN, issuer 150 may also agree to sell an option to hedge counter-party 170. Hedge counter-party 170 pays a premium that lowers issuer's 150 cost of funding the CERN. The option reflects a right of its holder to receive an amount equal to the difference between the originally scheduled interest payable on the CERN and the adjusted interest after the occurrence of the credit event. In addition, if investor 160 owns both the CERN and the applicable option, then investor 160 can tender the CERN and option to the issuer in return for which the issuer will deliver a fixed interest rate bond. The delivered fixed interest rate bond would not include a credit event. This can happen both before and after the occurrence of a credit event.

To the extent the CERN was tenderable by investor 160 to issuer 150, the option would also allow a holder of the option who also owned the CERN to tender the CERN to issuer 150 after the occurrence of a credit event on the originally scheduled tender date.

Referring again to FIGS. 1A and 1B, arrangement 100 commences with transaction 105.

In transaction 105, issuer 150 issues the CERN to investor 160, and in turn, investor 160 pays a par value of the CERN to issuer 150. The CERN is linked to a credit event with respect to a reference entity, which for purposes of example is designated herein as XYZ Corporation. That is, the CERN has a provision for a right of investor 160 to receive interest on the CERN for a credit term unless the credit event occurs with respect to XYZ Corporation.

Hedge counter-party 170 pays a fee, as described above, to issuer 150. From issuer 150, hedge counter-party 170 obtains a right that is exercisable if the credit event occurs. In one embodiment of the invention the right entitles hedge counter-party 170 to receive a payment from issuer 150 after the occurrence of a credit event. In an alternative embodiment, the right entitles hedge counter-party 170 to receive the par value from issuer 150 in exchange for an investment that matures to the par value of the CERN at maturity if the credit event occurs.

Assume that issuer 150 could issue a standard bond, i.e., not a CERN, that matures in five years and pays 4% annual interest. However, since transaction 105 involves a CERN that is linked to XYZ Corp., investor 160 will demand an enhanced yield, greater than 4% interest.

The CERN is created by converting the bond into a 30-year step-interest bond. For example, instead of issuing the bond maturing in 5 years with a 4% interest, issuer 150 sells the following CERN linked to the credit performance of XYZ Corp.:

| Final Maturity: | 30 Years |
|---|---|
| Interest: | |
| Until the earlier of Year 5 or the credit event | 6% |
| After year 5 or the credit event | 0% |
| Tender Feature: | Tenderable in Year 5 if the credit event does not occur |

Accordingly, for this example, assume that the CERN has a par value of $10 million. Issuer 150 issues the CERN to investor 160, and investor 160 pays a par value of $10 million to issuer 150.

Assume that the fee paid by hedge counter-party 170 to issuer 150 is 3% of the par value of the CERN. The fee decreases issuer 150's cost of funding the CERN and enables issuer 150 to pay the enhanced yield to investor 160. As such, from the perspective of issuer 150, issuer 150 pays a net interest of 3% on the CERN.

3% net=6% initial−3% fee

Transaction 110 shows an exchange that occurs during the credit term period, as long as the credit event has not occurred. More specifically, during the credit term period, as long as the credit event has not occurred, issuer 150 pays investor 160 a yield of 6% on the CERN.

Transaction 115 shows an exchange that occurs at the end of the credit term, e.g., the Tender Date at the end of Year 5, if the credit event did not occur. Investor 160 tenders the CERN back to issuer 150, and in turn, issuer 150 returns the par of $10 million to investor 160.

Transaction 120 shows an exchange that occurs at the end of the credit term, e.g., the Tender Date at the end of Year 5, if the credit event did occur. Depending on the arrangement between issuer 150 and hedge counter-party 170 (see transaction 105), Issuer 150 (a) pays the interest to hedge counter-party 170 until the Tender Date at the end of Year 5, and (b) pays par, e.g., $10 million, to hedge counter-party 170 on the Tender Date. In turn, hedge counter-party 170 delivers to issuer 150, an investment returning par in Year 30. Such an investment could be, for example, a zero interest bond. A zero interest bond is an asset where an issuer of the asset does not make any payment, e.g. interest, until a maturity date of the asset. A zero coupon bond is an example of a zero interest bond. Investor 160 loses the right to tender the CERN to issuer 150 on the Tender Date. Investor 160 will receive principal at the end of Year 30.

The CERN has a stepped interest rate structure. In the event that a defined credit event occurs, the interest rate on the CERN will reset from its initial rate to zero until maturity. The issuer 150 then pays the original interest amount to the hedge counter-party 170.

Transaction 125 shows an exchange that occurs at the maturity date of the CERN (see transaction 120). The investment, e.g., zero coupon bond, delivered by the hedge counter-party on the Tender Date at the end of Year 5 matures and Issuer 150 uses the proceeds to pay investor 160 the par amount, e.g., $10 million.

The CERN can have any maturity date, but in practice, a period of 20 to 40 years appears to be practical. The CERN may replace either a standard serial bond or a standard term bond. Serial bonds have short to intermediate terms and mature on a specific date with out any amortization. Term bonds are longer term and are subject to early amortization prior to the specified maturity date. If the CERN replaces a serial bond, then the CERN will preferably have a tender date on the expected serial maturity date, but a nominal final maturity date at 20 to 40 years after the tender date. If the CERN is replacing a term bond, then the CERN will preferably mature on the same date on which the term bond was scheduled to mature.

The credit term can be for any desired period. For example, if the CERN is replacing a serial bond, then the credit term can match the scheduled term for the serial bond. In other words, a 3-year serial will have a 3-year credit term. If the CERN is replacing a term bond, then the credit term can be any period that ends prior to the scheduled maturity.

Note again that the initial rate, during the credit term, is higher than a standard rate or normal rate that issuer 150 would pay if the arrangement did not involve a CERN. A variety of scenarios are contemplated, for example:

(A) if the CERN is replacing a term bond, the rate will drop after the Credit Term to a lower fixed rate; or (B) if the CERN is replacing a serial bond, the rate will drop to zero after the Credit Term (on a Tender Date).

In any event, if the credit event occurs during the credit term, then the rate is reduced, and may drop to zero, until maturity, which may also be extended.

The CERN can be structured with any appropriate tender date. For example, if the CERN is replacing a serial bond, then the CERN will be subject to a contingent mandatory tender on the original scheduled maturity date for the serial bond. The tender date will be at the end of the credit term. So long as the credit event has not occurred prior to the end of the credit term, the CERN will be tenderable to issuer 150 at par. If the credit event has occurred, the CERN will not be tendered and will remain outstanding to the final maturity date which can be 20 to 30 years after the tender date.

In another scenario, issuer 150 can issue the CERN with a matching warrant. The warrant reflects a right to receive an amount equal to the original interest payable on the CERN, where the payment is contingent upon the occurrence of the credit event. The CERN will have a step down interest structure. Interest on the CERN will be paid initially at a high rate that will drop on a date certain to a pre-set lower rate. If the credit event occurs prior to the interest rate reset date, the interest rate on the CERN automatically drops to zero until maturity. Issuer 150 then pays the amounts originally to be paid as interest on the CERN to the holder of the warrant. A holder of the CERN and warrant will have a right to link the two together and create a single step down interest bond.

The present invention also provides for a CERN that pays interest on a tax-exempt basis. The use of the adjustment to the interest rate as well as the extension of the maturity date creates an instrument that will be viewed as non-contingent payment debt. The CERN is debt as it ensures the right of the investor to be paid principal in all cases. Prior art does not provide for return of principal. Furthermore, the CERN does not appear to be contingent payment debt under the US Tax regulations. As such, all the interest paid on the CERN would be deemed to be interest under US Tax regulations and if the CERN was issued as otherwise qualifying tax exempt debt, interest would be tax exempt.

Advantageously, the present invention:

(1) creates a credit event referenced debt obligation;

(2) is not subject to the contingent payment debt rules under the U.S. Internal Revenue Code;

(3) provides for interest payments that are not subject to U.S. federal income taxes;
(4) lowers the effective interest cost for the issuer of the debt; and
(5) allows the credit event referenced element of the debt to be removed by the use of an option.

Financial instruments, and more specifically the rights and obligations represented by such instruments, are often transferred or assigned from a first party to a second party. For example, a first creditor that is an original purchaser of a financial instrument may transfer its rights and obligations to a second creditor. As such, in the context of the present invention, the terms "issuer", "investor (or creditor)", and "hedge counter-party" each refer to an entity having the rights and responsibilities of the issuer, the investor (or creditor) and the hedge counter-party, respectively. Since the rights and responsibilities are transferable or assignable, an entity having such rights and responsibilities is not necessarily the same physical or legal entity for the duration of a life of an asset. For example, a reference to "the investor" is a reference to an entity having the rights and responsibilities of the investor, and it is not necessarily a reference to a party that was an original investor.

Figure 2:
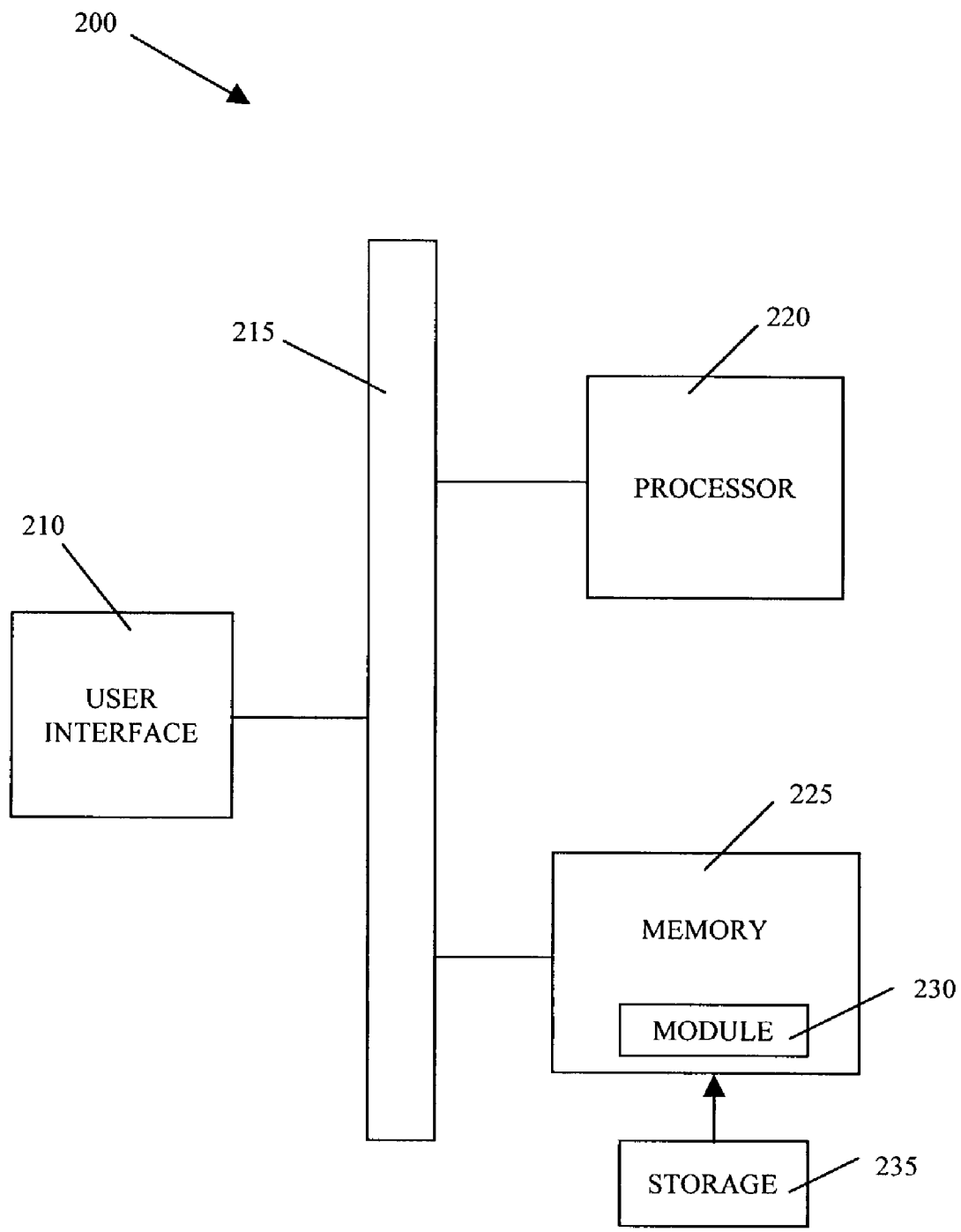
FIG. 2 is a block diagram of a system suitably configured to execute a method for managing a credit event referenced asset arrangement.

FIG. 2 is a block diagram of a system 200 suitably configured to execute a method for managing a credit event referenced asset arrangement such as arrangement 100. More particularly, system 200 receives data relating the arrangement, and provides an output that indicates the status and value of the CERN. For example, given information describing the credit term, maturity date and interest rates, system 200 calculates interest payments and dates of such payments. Also, if the credit event occurs, system 200 recalculates the interest payments and the dates thereof. Furthermore, system 200 determines all of the other parameters described for each of the aforementioned scenarios.

By way of example, system 200 may be used by issuer 150 and hedge counter-party 170 to:
(1) designate parameters for credit events;
(2) monitor news wire services for credit events;
(3) calculate probability of default of reference entity based on credit ratings;
(4) capture terms of transaction;
(5) calculate payments; and
(6) determine an optimum portfolio of investment to be delivered by hedge counter-party 170 to issuer 150.

System 200 may be implemented on a general purpose microcomputer, such as one of the members of the Sun™ Microsystems family of computer systems, one of the members of the IBM™ Personal Computer family, or any conventional work-station or graphics computer device. Although system 200 is represented herein as a standalone system, it is not limited to such, but instead can be part of a networked system. The principal components of system 200 include a user interface 210, a processor 220 and a memory 225 coupled for communication via a bus 215.

Processor 220 is a microprocessor or similar computational device that executes instructions, e.g., a program.

User interface 210 allows a user to input information into, and receive information from, system 220. A suitable implementation of user interface 210 includes an output device such as a video display and a printer, with which the user can observe information generated by system 220. User interface 210 also includes an input device such as a keyboard, a cursor control device (e.g., a mouse, track-ball, or joy stick) that allows the user to manipulate a cursor on the video display, or a speech recognition subsystem, for enabling the user to communicate information and command selections to processor 220.

Memory 225 stores data and instructions for controlling the operation of processor 220. It includes a program module 230 of such instructions to perform methods in accordance with the present invention as described herein. While the instructions required to execute the invention are indicated as already loaded into memory 225, they may be configured on a storage media 235 for subsequent loading into memory 225. Storage media 235 an be any conventional storage media such as a magnetic tape, an optical storage media, a compact disk, or a floppy disk. Alternatively, storage media 235 can be a random access memory, or other type of electronic storage, located on a remote storage system.

It should be understood that various alternatives and modifications of the present invention could be devised by those skilled in the art. Nevertheless, the present invention is intended to embrace all such alternatives, modifications and variances that fall within the scope of the appended claims.

What is claimed is:

1. A system, comprising:
memory operable to store at least one program; and
at least one processor communicatively coupled to the memory, in which the at least one program, when executed by the at least one processor, causes the at least one processor to:
access and process data regarding a credit event referenced asset comprising a credit term, a maturity date and a par value, wherein said maturity date is later than an end of said credit term; and
calculate, for said credit term, interest at a first interest rate until a credit event occurs during said credit term,
record, after the occurrence of the credit event during said credit term, an extension of said maturity date to a later extended maturity date,
calculate, after the occurrence of the credit event during said credit term, interest at a second interest rate until said later extended maturity date,
record data regarding an investment received in exchange for a payment of said par value, wherein said investment matures to said par value at said maturity of said asset, and
calculate, when no credit event occurs during said credit term, interest at a third interest rate for a time period from the end of said credit term to said maturity date.

2. The system of claim 1, wherein an issuer of said asset receives said par value in exchange for issuing said credit event referenced asset.

3. The system of claim 1, wherein said credit event is selected from the group consisting of bankruptcy, failure to make payment on a debt, obligation acceleration, repudiation/moratorium, and restructuring.

4. The system of claim 1, wherein said investment is a zero interest bond.

5. A computer implemented method, comprising:
accessing, by a processor, data regarding a credit event referenced asset comprising a credit term, a maturity date and a par value, wherein said maturity date is later than an end of said credit term;
calculating, by a processor, for said credit term, interest at a first interest rate until a credit event occurs during said credit term;
after the occurrence of the credit event during said credit term;
recording, by a processor, an extension of said maturity date to a later extended maturity date, calculating, by a processor, interest at a second interest rate until said later extended maturity date, and record data regarding an investment received in exchange for a payment of said par value, wherein said investment matures to said par value at said maturity of said asset; and when no credit event occurs during said credit term:

calculating, by a processor, interest at a third interest rate for a time period from the end of said credit term to said maturity date.

6. The method of claim 5, wherein said investment is a zero interest bond.

7. The method of claim 5, wherein an issuer of said asset receives said par value in exchange for issuing said credit event referenced asset.

8. The method of claim 5, wherein said credit event is selected from the group consisting of bankruptcy, failure to make payment on a debt, obligation acceleration, repudiation/moratorium, and restructuring.

* * * * *